(No Model.)
W. A. OTTO.
BELT GEARING.
No. 318,577. Patented May 26, 1885.
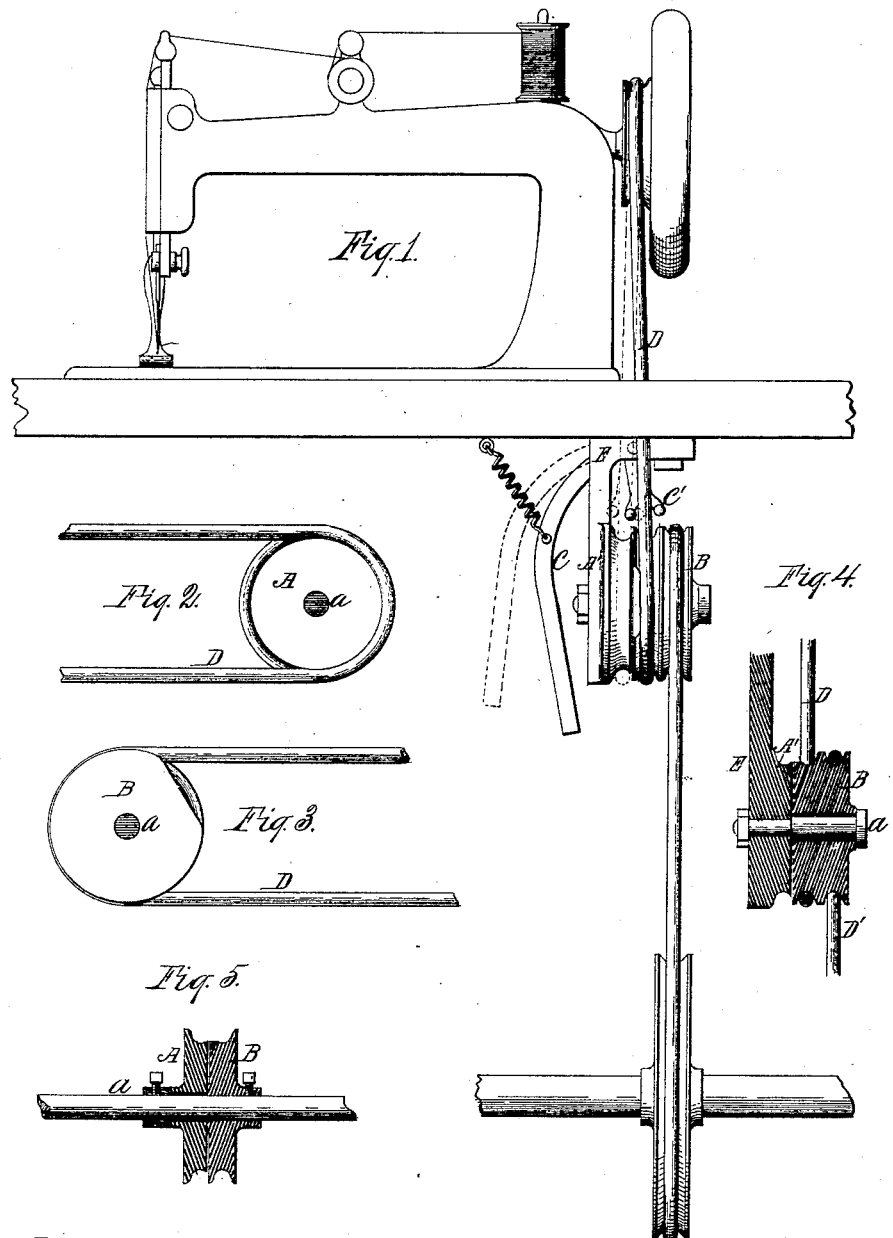

UNITED STATES PATENT OFFICE.

WILLIAM A. OTTO, OF CEDAR RAPIDS, IOWA.

BELT-GEARING.

SPECIFICATION forming part of Letters Patent No. 318,577, dated May 26, 1885.

Application filed February 9, 1885. (No model.)

*To all whom it may concern:*

Be it known that I, WILLIAM A. OTTO, a citizen of the United States, residing at Cedar Rapids, in the county of Linn and State of Iowa, have invented certain new and useful Improvements in Belt-Gearing, of which the following is a specification.

This invention relates to grooved pulleys for transmitting power; and it consists in such a construction and adaptation of an active pulley and an idler as will admit of the belt being quickly and easily shifted from one to the other for the purpose of starting or stopping the motion.

In the accompanying drawings, forming a part of this specification, Figure 1 represents a front elevation of the invention applied to a sewing-machine; Fig. 2, the inner face of the idle-wheel with belt applied; Fig. 3, a similar view of the active-pulley; Fig. 4, a vertical cross-section of the device represented in Fig. 1, and Fig. 5 the same applied to an ordinary counter-shaft.

Similar letters of reference indicate corresponding parts.

In the use of grooved pulleys adapted to transmit motion by a round or similar belt, difficulty has been experienced in controlling the motion because the flanges of the pulley prevented the shifting of the belt as in the case of pulleys having a plane face. It is to overcome this objection to the grooved pulley or sheave and adapt it to general use that I have invented the device which I will now describe.

The active or power-transmitting pulley B is provided with a flange each side of the belt, like the common sheave; but to admit of the belt being shifted to the idler A, a segment of the inner flange is removed to a point at or near the bottom of the groove. This pulley is permanently connected with the counter-shaft or the driving mechanism, and its motion is therefore continuous. Adjoining it, on the side where a portion of the flange is removed, is set the idler A, a sheave of the same diameter, and generally similar, except that the flange next the active pulley is nearly all removed. It is desirable that a slight groove be left in the idler, enough to retain the belt D, but not prevent the easy shifting thereof.

Sufficient space is left between the perfect flange of the idler and the incomplete flange of the other pulley to hold the belt without friction.

The operation of the device will be readily seen. Whenever in its revolution the cutaway portion of the pulley B is parallel with the belt D, the latter can be instantly shifted by the shifter C or any analogous device. In cases where the revolution of the pulley is rapid, the removal of one segment will admit of the operation being performed more quickly than in the case of flat belts and plane-faced pulleys. Where the motion is slower two or more segments may be removed, the portion of the flange remaining being sufficient to retain the belt. The device is specially applicable to all places where a quick stoppage of the motion is required, and where economy in space is desirable.

To secure an almost instantaneous cessation of motion, the idler A' may be fixed, either to the hanger E or to some other suitable permanent fixture, and the belt may be shifted back and forth with equal facility as though the idler were movable—an operation impossible with the flat belt. This renders the invention particularly useful in connection with sewing-machines in factories, and other light-running machines requiring quick starting and stopping.

Hitherto brakes operated by the foot have been employed to stop the motion of such machines, but in the case of sewing-machines running at a high speed it has been found impossible, with the best brake, to stop the machine within two or three stitches; but with this device the same machine at the same speed may be stopped within the space of a single stitch. For this purpose the shifter-fork, C', is connected with a pivoted lever, C, operated by the knee. A suitable spring throws the device out of gear as soon as the pressure is removed from the lever.

Besides the advantage gained in the matter of speed, this device is much less expensive than the brake, and its application does not, as in the case of the common foot-brake, obstruct the floor, collect dust and dirt, and interfere with sweeping.

Having thus described my invention, what

I claim as new, and desire to secure by Letters Patent, is—

1. A grooved pulley or sheave connected with the source of motion, and having one or more segments of one or both its flanges removed, whereby the belt may be shifted to and from an idle-wheel, substantially as shown and described.

2. An idle-wheel having a single flange, and a slight groove in its perphery to retain a round or analogous belt, and adapted to operate in connection with an active pulley having one or more segments removed from the flange adjoining the side of the idler devoid of a flange, substantially as and for the purpose set forth.

3. An active grooved pulley or sheave having one or more segments of flange removed, in combination with a loose or fixed idle-wheel having only one flange, said wheels being so arranged that their lesser faces are contiguous, substantially as and for the purpose set forth.

4. In combination with a belt-shifter, a grooved active pulley or sheave having one or more segments of flange removed, and an idle-wheel devoid of a flange on the side adjoining the active pulley, and the incomplete flange thereof, and all constructed, arranged, and operating substantially as and for the purpose set forth.

In testimony whereof I affix my signature in presence of two witnesses.

WILLIAM A. OTTO.

Witnesses:
L. T. WILCOX,
F. L. WILCOX.